United States Patent [19]

Wehrenberg

[11] 4,358,958

[45] Nov. 16, 1982

[54] ATTACHABLE, LEVEL-CORRECTING VOLUMETER AND STAND FOR ROUND BOTTOM FLASKS

[76] Inventor: Charles C. Wehrenberg, 72 Kissling St., San Francisco, Calif. 94103

[21] Appl. No.: 191,708

[22] Filed: Sep. 29, 1980

[51] Int. Cl.$^3$ .............................................. G01F 19/00

[52] U.S. Cl. ....................................... 73/428; 248/150

[58] Field of Search ......................... 73/426, 427, 428; 422/104, 102, 103; 248/150, 152, 165, 529, 542

[56] References Cited

U.S. PATENT DOCUMENTS 765,611 7/1904 Carr ..................................... 73/428

1,879,837 9/1932 Bierlich .............................. 248/165

2,335,020 11/1943 Nehrich ............................. 248/152

2,936,144 5/1960 Otis .................................... 248/150

*Primary Examiner*—S. Clement Swisher

[57] ABSTRACT

A combined stand and volume meter for round bottom flasks which functions regardless of the flask neck orientation. Interlocking planes of material create a greater than hemispheric cavity encircling the flask. Horizontal parallel lines, calibrated in volumetric units pass across the cavity, allowing for flask orientation compensation by Visual correlation of the fluid level and volumetric lines.

3 Claims, 3 Drawing Figures

ATTACHABLE, LEVEL-CORRECTING VOLUMETER AND STAND FOR ROUND BOTTOM FLASKS

SUMMARY

This invention consists of two flat pieces of flexible material cut and printed specifically so that they will notch-fit or hinge-fit together and thereby construct a device that will hold a round bottom vessel (of the appropriate radius). The specific design and the flexibility of the material used allows a round bottom flask to fit into the device (and thereby function as a stand) and allows the device to be lifted with the flask (attachable). Specifically spaced (for each specific radius), parallel lines printed parallel to the horizontal edges of the device allow the device to indicate volume of liquid within the flask. The parallel lines allow the device to indicate if the device is level or how to correct level so that accurate volume measurement can be made. The combination of attachability and leveling compensation allows the device to be used as a volumeter for a round bottom flask which is attached to a system and which is not necessarily situated with its neck vertical.

DRAWINGS

FIG. I is a side view of the invention showing relationship of circular cuts and notches; shows parallel lines and volume numbers relative to horizontal, bottom edge.

FIG. II is a plan view of the invention showing perpendicular, notch assembly.

FIG. III is a perspective view of the invention showing how notch assembly creates the spherical flask cavity relative to the parallel, volumetric lines.

DETAILED DESCRIPTION

Figure 1:
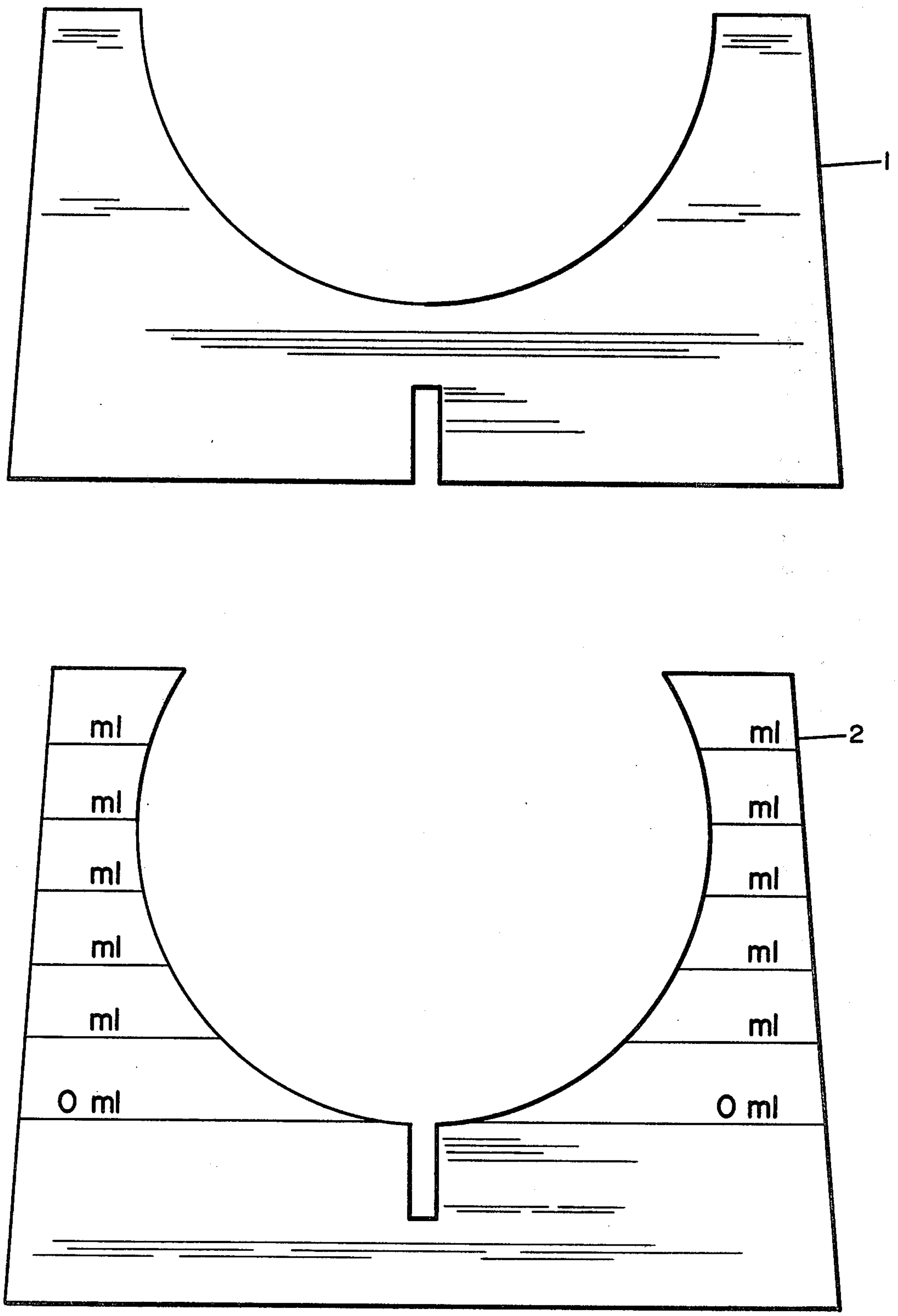
Figure 2:
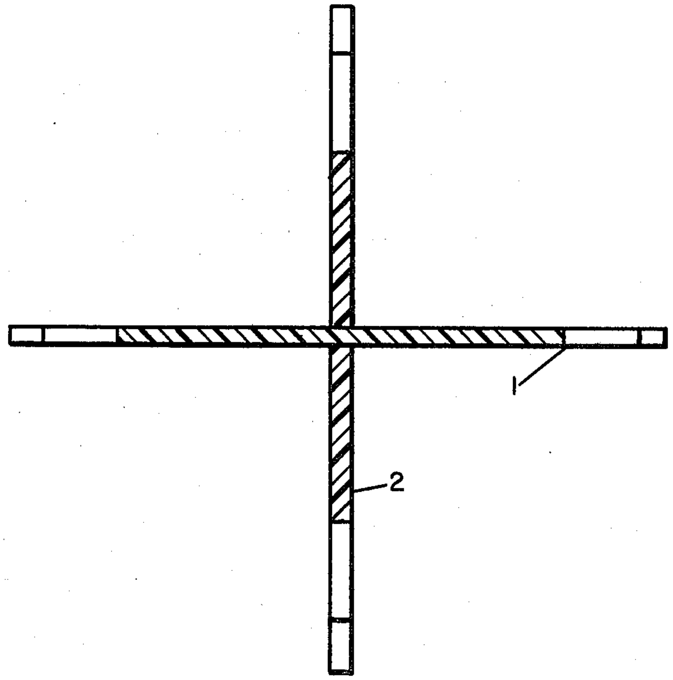
Figure 3:
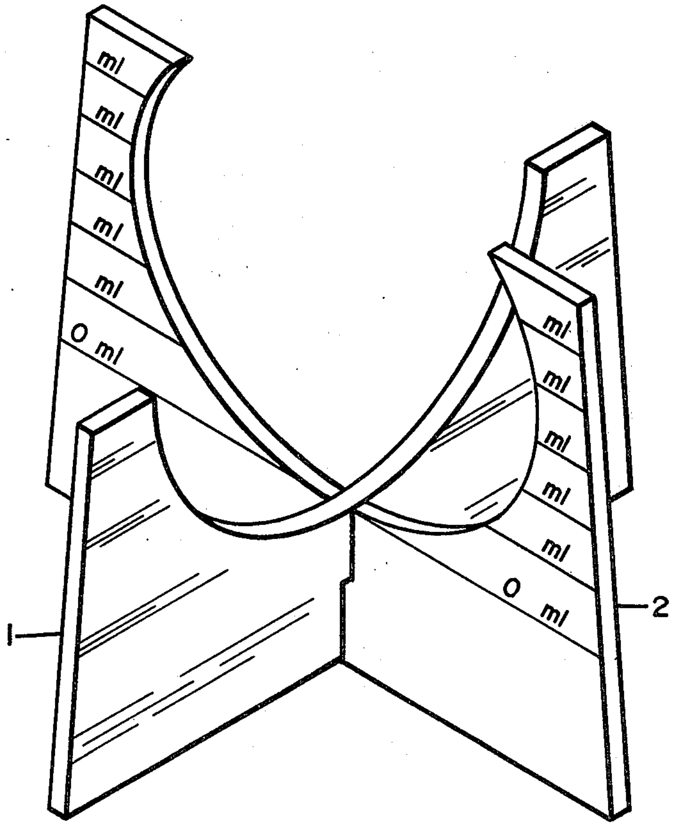

This invention consists of two parts, PART 1 and PART 2, which when assembled together become the actual device which will then function as a stand and volumeter for a round bottom flask of appropriate radius. It is necessary to use a different device for each different diameter of round bottom flask.

PART 1:

This part is a flat, formed or cut piece of approximately $\frac{1}{8}''$ thick flexible material (ie: high density polyethylene or corrugated cardboard). The overall part is a trapezoid whose long, parallel dimension is approximently one and one half times the diameter of the appropriate flask and whose height is approximately the diameter of the flask. Unequally spaced, calibrated, parallel lines are printed onto or formed into PART 1. These lines are parallel to the long edge and are on both sides of the part. Each line is numbered to indicate milliliters. The numbers are printed on both ends of each line near the short edges. A line X inches from the bottom edge is called 0. The numbering indicates successively larger volumes as they rise from zero. The placement and values on the lines can vary according to flask size and volume increment desired. The placement of the lines can be determined by calibration or calculation. Into the top long edge of PART 1 a greater than semicircular notch is cut representing approximately 270 degrees of a circle corresponding to the appropriate flask outer diameter. The center of the circular cut is on the PART 1 vertical midline. The bottom of the circular cut touches the line numbered 0. A rectilinear notch is cut from the point of the circular notch touching the 0 line downward X"/2. This is the assembly notch and its width is the thickness of the material of PART 2 plus only enough clearance to allow an easy fit. The orientation of this rectilinear notch is that the notch's centerline passes through the center of the semicircular cut and the notch's centerline is perpendicular to the bottom of the device and to the calibrated lines.

PART 2:

This part is a flat, formed or cut piece of approximately $\frac{1}{8}''$ flexible material. The overall part is a trapezoid whose long dimension is identical with the long dimension PART 1 and whose height is equal to or less than the radius of the appropriate flask+1". The top, long edge of PART 2 is cut with a circular cut with its center of radius on the PART 2 vertical midline and the bottom of the circular cut being X" from the bottom of PART 2. A second assembly notch is cut into the bottom edge of PART 2. The assembly notch is rectilinear being X"/2 in the long dimension and slightly wider than the material thickness of PART 1. The orientation of the assembly notch is that its long dimension centerline is perpendicular to the bottom edge and passes through the center of the semicircular cut. The assembly notch indents X"/2 upward from the bottom edge of PART 2.

ASSEMBLED DEVICE:

When the assembly notches are interlocked a greater than hemispherical cavity is created by the planes of flexible material. The dimensions of the spherical cavity are those of the outer diameter of the appropriate round bottom flask. Because the cavity is more than hemispheric in one plane the the flask must be pushed into the cavity. The flexibility of the material permits this and also causes the material to snap back which allows the device to encircle the flask. The device can be used as a stand and bench top volumetric or, if the flask with attached device is lifted and/or attached to a machine or system, the device can be used as a volumetric. By gyrating the device so that any fluid level is marked by the same valued line on both sides, the device is leveled relative to any orientation of the round bottom flask and the device will then function as a volumetric for the flask.

I claim:

1. A knockdown holder for a receptacle comprising: at least two planar parts of stiff but elastically deformable material, each formed with a first edge for supporting the holder on a planar surface at substantially right angles thereto and a second edge opposite the first edge configured to engage the outer surface of the receptacle, each of the parts being provided with a means to engage a corresponding means of another part which when assembled form a three dimensional support, at least one of said parts being provided with indicia corresponding to predetermined volumes of liquid in the supported receptacle.

2. The invention as described in claim 1 wherein the second edge of one of the parts defines two upstanding fingers engaging the receptacle, there being corresponding indicia on the upstanding opposite fingers with volumetric designations.

3. The invention as described in claim 1 wherein the second edge of one of the parts defines two upstanding fingers which engage an upper smaller cross sectioned part of the receptacle.

* * * * *